Aug. 18, 1959 — D. F. GARMAN — 2,899,729
MOLDING FASTENER
Filed June 12, 1957 — 2 Sheets-Sheet 1

INVENTOR.
DONALD F. GARMAN
BY
ATTORNEY

INVENTOR.
DONALD F. GARMAN
BY
ATTORNEY

United States Patent Office

2,899,729
Patented Aug. 18, 1959

2,899,729

MOLDING FASTENER

Donald F. Garman, Toledo, Ohio, assignor to Prestole Corporation, Toledo, Ohio, a corporation of Michigan Application June 12, 1957, Serial No. 665,149

5 Claims. (Cl. 24—73)

This invention relates to molding fasteners for securing hollow moldings of a well known type to body panels.

It is presently customary to secure moldings to the panels of automobile bodies, doors or the like by spring stud fasteners, which are assembled with their heads in the moldings and the shanks projecting therefrom. The shanks are then sprung or snapped into holes in the supporting panel thereby to hold the molding in the desired position against the panel. Not infrequently moldings are mounted on automobile body panels and are required to align with similar moldings on door panels for example. Due to manufacturing inaccuracies or other reasons, it happens that these moldings are often out of alignment and difficulty is encountered in forcing one or another molding to a position where alignment is effected. Oftentimes in this attempt, moldings or panels or both become marred or damaged.

An object of this invention is to produce a fastener which effectively secures a molding in position against the supporting panel but which makes possible the adjustment of the molding in a lateral direction without damage to it or to the panel, thereby to effect alignment for example with another molding without difficulty and with a minimum of effort.

Another object is to produce a molding fastener which can rotate relative to its stud mounting thereby to enable predetermined adjustment of the molding when the latter is mounted in position of use on its supporting panel.

A further object is to produce a fastener of the above character formed from a single length of wire suitably shaped to provide a unique molding engaging head which makes possible a lateral adjustment of the molding while the same is engaged by a series of fasteners.

A still further object is to produce a fastener of the above type having novel means for imparting pressure to associated parts for retaining the parts in position and preventing rattling or vibratory noises.

Other objects and advantages reside in details of construction and arrangement and for purposes of illustration but not of limitation, embodiments of the invention are shown on the accompanying drawings in which Figure 1 is a fragmentary plan view showing a molding secured by a fastener to a supporting panel;

Figure 1:
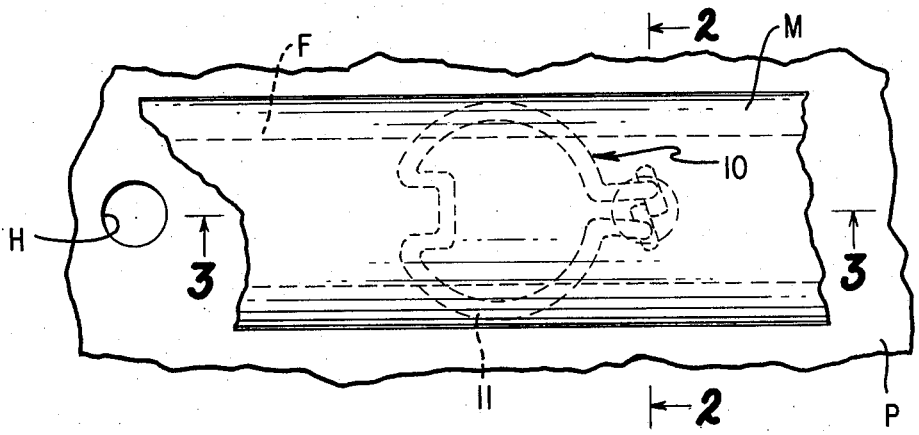
Figure 4:
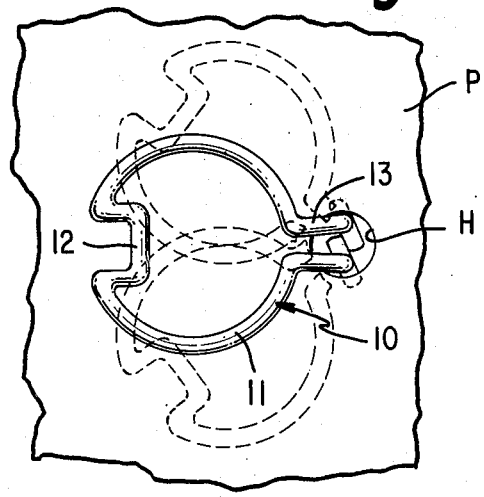
Figure 4 is a plan view of the fastener without the molding strip and showing the manner in which it may be rocked from one position to another, thereby enabling the molding to be adjusted laterally to a desired position.
Figure 2:
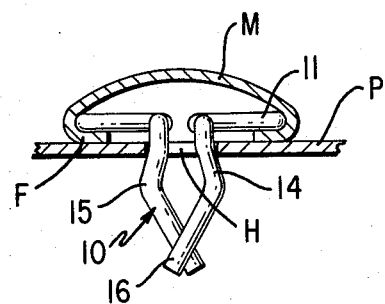
Figure 2 is a transverse sectional view substantially on the line 2—2 of Figure 1.
Figure 3:
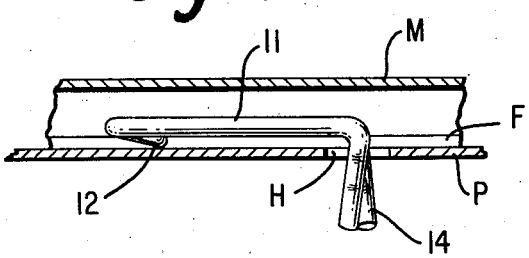
Figure 3 is a longitudinal sectional view substantially on the line 3—3 of Figure 1.

The illustrated embodiment of the invention comprises a body panel P which is provided with a row of holes H to receive fasteners for securing a molding strip M thereto. The molding strip M as shown is provided with a pair of longitudinally extending inturned flanges F which are substantially spaced from each other. For securing the molding strip to the panel P a series of molding fasteners or clips 10 are provided, one being mounted in each of the holes H. It will be understood that a series of these fasteners are first applied to the molding, being slid in from one end thereof and then after the required number has been attached, they are forced into the holes H.

As shown in Figures 1 to 4, the molding fastener consists of a single piece of spring wire round in cross-section formed with a circular body portion 11 of such diameter as to fit snugly into the molding in overlapping relation with the inturned flanges F. Integrally formed at one side of the circular body 11 is a substantially U-shaped reentrant detent portion 12, the free end of which is downwardly inclined, as indicated on Figure 3, in order to apply tension to the circular head of the fastener, by engaging the adjacent portion of the supporting panel P. Manifestly the detent 12 which is in the form of a relatively short spring arm tends to force the head of the fastener upwardly into engagement with the molding M. The detent 12 also serves as a stop for limiting the movement of the head in one direction or the other because of its engagement either with a molding flange or with the wall of the molding. If a more positive stop is required, the U-shaped detent 12 may project outwardly of the head instead of inwardly as shown, and in such event the detent then would positively abut against an inner wall of the molding.

In diametrically opposed relation to the detent portion 12 and substantially in the plane of the body portion is a pair of lateral arms 13 providing an integral continuation of the body as will be manifest. At the outer ends of the arms 13 are depending legs 14, each having an outwardly bowed portion 15 providing oppositely inclined cam guiding surfaces which engage the wall of the hole H in which the legs are inserted for frictionally and resiliently retaining the fastener in position. The free ends 16 of the legs are in crossing, overlapping relation.

From the above description it will be apparent that the head of the fastener is disposed at one side of the attaching shank or leg portion. This enables the head to rotate in one direction or the other through a substantial angle of approximately 90° so that by an eccentric cam-like action the molding M can be moved laterally in one direction or the other after the spring legs have been inserted in aperture H. This makes possible minor adjustment of moldings so that they can be aligned with other moldings or moved to the position desired. The annular form of the head enables the rotation to be effected since it will roll within the molding body and in view of the spring structure of the legs 14, the parts are retained in the desired position of adjustment. Such retention is aided by the spring detent 12 which frictionally engages the surface of the panel P.

Figure 5:
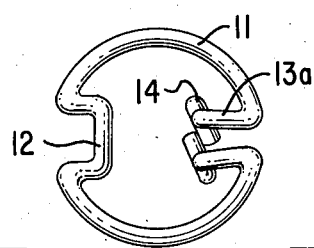
Figure 5 is a top plan view of an alternate form of molding fastener in which the attaching legs are disposed within the confines of the circular head.
Figure 6:
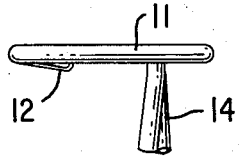
Figure 6 is an edge elevation on the line 6—6 of Figure 5.

Instead of having the legs 14 disposed outwardly in spaced relation from the circular head 11, they may be arranged as indicated on Figures 5 and 6, in which arms 13a extend inside the circular head 11. Otherwise the fastener shown in these figures is the same as that above described.

Figure 7:
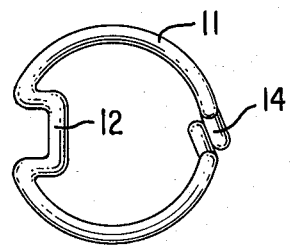
Figure 7 is another alternate form of molding fastener in which the leg portions are substantially in the plane of the circular body.
Figure 8:
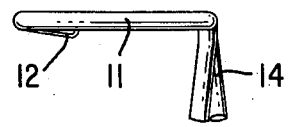
Figure 8 is an edge elevation on the line 8—8 of Figure 7.

Figures 7 and 8 illustrate another form which is very similar to the form in accordance with Figures 1 to 4 except that the legs 14 extend at substantially right angles from the circular body 11 so that they are disposed substantially in the plane of the circular body instead of being disposed either outside or inside of the head 11.

Figure 9:
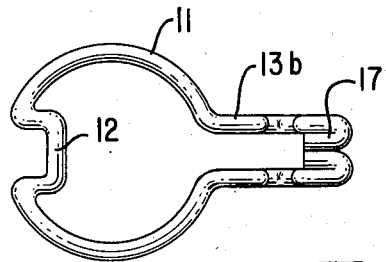
Figure 9 is a top plan view of another alternate form of molding fastener showing a different leg attaching structure in which the snap-on legs are in the form of a V and integral with the remainder of the fastener.
Figure 10:
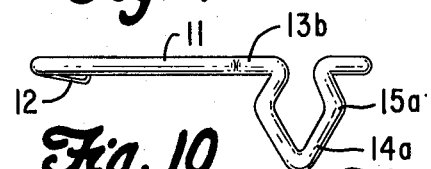
Figure 10 is a side edge elevation of the fastener taken on the line 10—10 of Figure 9.

In the form of the fastener shown in Figures 9 and 10, the attaching or leg portion is disposed at one side of the circular head 11 but as shown, the arms 13b extend laterally outside of the head and are integrally formed with depending attaching legs 14a having outwardly bowed portions 15a providing oppositely inclined cam guiding surfaces to engage the edge of the hole H as will be readily apparent. In this form the end portions of the wire are bent inwardly, as indicated at 17, and are disposed between the arms 13b. The end portions 17 in this form provide a positive stop by engagement with the inner wall of the molding. It should be observed that this form of fastener allows greater lateral molding movement.

Figure 11:
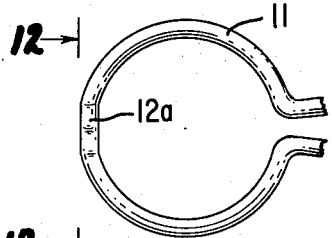
Figure 11 is a plan view of still a further form of molding fastener, only a fragment being shown, in this form the detent being differently formed.
Figure 12:
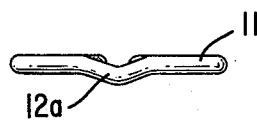
Figure 12 is an edge view of the fastener shown in Figure 11 taken on the line 12—12 of Figure 11 and showing the detent structure more clearly.

The form of the fastener shown in Figures 11 and 12 is in accordance with the form shown in Figures 1 to 4 except the U-shaped reentrant detent 12 is replaced by a substantially V-shaped detent 12a which as indicated on Figure 12, extends downwardly to provide a nubbin-like element to engage the supporting panel P to effect spring-like frictional engagement therewith.

Figures 13, 15:
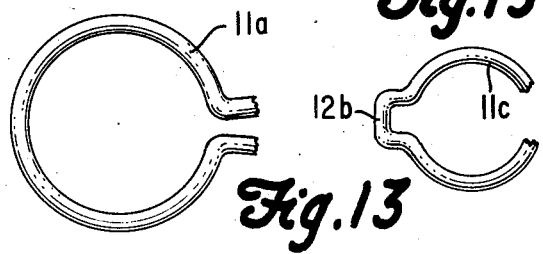
Figure 13 is a fragmentary plan view of a still further form of molding fastener in which the head is in the form of an uninterrupted circle except for the leg attaching portions.
Figure 15 is a fragmentary view of another form of fastener having a different form of positive stop.

Figure 13 shows a portion of a molding fastener very similar to that above described except the detent portion, such as 12 and 12a is eliminated and in this instance the frictional engagement between the attaching legs and the edges of the panel hole are relied upon to retain the fastener and molding in the position of adjustment.

Figure 14:
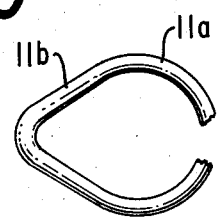
Figure 14 is a fragmentary plan view of another form of fastener incorporating a positive stop feature.

The form of fastener shown in Figure 14 has a head formed with a pair of curved molding engaging side portions 11a which enable rocking of the fastener in one direction or the other as above explained. Integral with one end of each curved portion 11a is a straight portion 11b which together form a V. In rocking the head laterally in one direction or the other on the curved portions 11a, the flat or straight portions 11b abut against one inner wall of the molding or the other, thus providing a positive stop for limiting the rocking movement of the fastener head.

According to Figure 15 the head 11c is similar to that above described, being formed with similar oppositely disposed curved molding engaging portions but instead of the reentrant detent 12 or the nubbin detent 12a, an outwardly extending integral portion 12b is provided at the end of the head opposite to the snap-on stud. The portion 12b is in the same plane as the head 11c and extends from the periphery a short distance to provide a positive stop for limiting the rotative movement of the head in one direction or the other by engagement with an inner wall of the molding.

It will be manifest that I have produced an exceedingly simple and inexpensive molding fastener which has the unique feature of being rotatable through a predetermined angle dependent upon design and movement required, the rotation being effected about the snap-on legs or stud as the axis and making possible the desired lateral adjustment of the molding in one direction or the other. Adequate frictional contact is afforded so that after adjustment has been effected, the molding remains in the selected position. In each form the rounded portion of the head rotates within the molding flanges. Thus alignment of molding which heretofore was a troublesome job, can be readily and conveniently effected without damage to either the molding or supporting panel.

Numerous changes in design, arrangement and choice of materials may be effected without departing from the spirit of the invention especially as defined in the appended claims.

What I claim is:

1. A fastener for supporting a molding having a top face joining laterally spaced longitudinal flanges disposed under the face, on a panel having an aperture, said fastener comprising a head having a pair of substantially co-planar diametrically opposed head portions curved along arcs of a circle, said portions fitting over the flanges of the molding and being rotatable thereon, a spaced pair of generally parallel arms respectively integral and co-planar with said head portions and extending directly laterally outward from the periphery of said circle, and a cooperating pair of spring studs respectively integral with said arms and extending generally perpendicular to the plane of said head portions and arms and engaging in said aperture, said curved head portions engaging the inner sides of the molding face with point contact, whereby the molding may be adjusted by moving the same so as to swing said head about the studs while rocking said curved head portions along the inner sides of the molding face.

2. A fastener as claimed in claim 1, and detent means on said head, said detent means comprising an integral extension on said head projecting laterally outward of said circle substantially diametrically opposite said arms and co-planar with the head portions, said extension being engageable with the inner side of the molding for limiting the rotation of the head.

3. A fastener as claimed in claim 1 and detent means on said head, said detent means comprising a projection integral with said head portions substantially diametrically opposite said arms and disposed in a plane intersecting the plane of the head portions, said projection engaging against the panel, whereby to resist swinging of said head.

4. A fastener as claimed in claim 3, said projection extending inwardly of the periphery of said circle.

5. A fastener for supporting a molding having a top face joining laterally spaced longitudinal flanges disposed under the face, on a panel having an aperture, said fastener comprising a head formed of spring metal having a pair of substantially co-planar diametrically opposed head portions curved along arcs of a circle, said portions fitting over the flanges of the molding and being rotatable thereon, an adjacent pair of spring studs integrally connected with said head portions and extending generally perpendicular to the plane of said head portions and engaging in said aperture, said head portions engaging the inner sides of the molding face with point contacts, whereby the molding may be adjusted by moving the same so as to swing said head about the studs while rocking said curved head portions along the inner sides of the molding face, and detent means on said head, said detent means comprising a projection integral with said head portions substantially diametrically opposite said studs and disposed in a plane intersecting the plane of the head portions, said projection engaging against the panel whereby to resist swinging of the head.

References Cited in the file of this patent

UNITED STATES PATENTS

| | | |
|---|---|---|
| 1,948,462 | Le Page | Feb. 20, 1934 |
| 2,032,499 | Place | Mar. 3, 1936 |
| 2,056,724 | Jackson | Oct. 6, 1936 |
| 2,057,587 | Place | Oct. 13, 1936 |
| 2,063,827 | Place | Dec. 8, 1936 |
| 2,104,239 | Place | Jan. 4, 1938 |
| 2,117,571 | Place | May 17, 1938 |
| 2,192,344 | Fernberg | Mar. 5, 1940 |
| 2,215,428 | Place | Sept. 17, 1940 |
| 2,254,311 | Place | Sept. 2, 1941 |
| 2,571,364 | Hosking | Oct. 16, 1951 |

FOREIGN PATENTS

| | | |
|---|---|---|
| 681,678 | Great Britain | Oct. 29, 1952 |